United States Patent
Zhang

(10) Patent No.: US 10,564,844 B2
(45) Date of Patent: Feb. 18, 2020

(54) TOUCH-CONTROL DEVICES AND METHODS FOR DETERMINING KEYS OF A VIRTUAL KEYBOARD

(71) Applicant: Wistron Corp., New Taipei (TW)

(72) Inventor: Sheng-Nan Zhang, New Taipei (TW)

(73) Assignee: WISTRON CORP., New Taipei (TW)

( * ) Notice: Subject to any disclaimer, the term of this patent is extended or adjusted under 35 U.S.C. 154(b) by 367 days.

(21) Appl. No.: 14/920,797

(22) Filed: Oct. 22, 2015

(65) Prior Publication Data
US 2016/0259545 A1    Sep. 8, 2016

(30) Foreign Application Priority Data

Mar. 6, 2015  (CN) .......................... 2015 1 0100307

(51) Int. Cl.
G06F 3/0488   (2013.01)
G06F 3/0489   (2013.01)
G06F 3/023    (2006.01)

(52) U.S. Cl.
CPC ........ G06F 3/04886 (2013.01); G06F 3/0236 (2013.01); G06F 3/04897 (2013.01); *G06F 2203/04808* (2013.01)

(58) Field of Classification Search
CPC .......................... G06F 3/04883; G06F 3/0488
See application file for complete search history.

(56) References Cited

U.S. PATENT DOCUMENTS

| | | | | |
|---|---|---|---|---|
| 9,678,662 B2* | 6/2017 | Luo | ...................... | G06F 3/04883 |
| 2009/0237361 A1* | 9/2009 | Mosby | ................ | G06F 3/04883 345/173 |
| 2013/0113714 A1* | 5/2013 | Mao | ...................... | G06F 3/0234 345/173 |
| 2013/0275907 A1* | 10/2013 | Lau | ...................... | G06F 3/04886 715/773 |
| 2014/0298266 A1* | 10/2014 | Lapp | ................... | G06F 3/04886 715/835 |

FOREIGN PATENT DOCUMENTS

| | | |
|---|---|---|
| CN | 101937313 A | 1/2011 |
| CN | 102736829 A | 10/2012 |

\* cited by examiner

*Primary Examiner* — Sherrod L Keaton

(57) ABSTRACT

A method suitable for a touch-control device having a touch-control surface for determining keys of a virtual keyboard is provided and includes: sensing positions of multiple control points on the touch-control surface to determine positions of multiple basic keys of a virtual keyboard; determining the input behavior of a user according to at least one touch behavior of at least one control point on the touch-control surface; and determining which key on the virtual keyboard is input by the user.

18 Claims, 16 Drawing Sheets

TOUCH-CONTROL DEVICES AND METHODS FOR DETERMINING KEYS OF A VIRTUAL KEYBOARD

CROSS REFERENCE TO RELATED APPLICATIONS

This Application claims priority of China Patent Application No. 201510100307.3, filed on Mar. 6, 2015, the entirety of which is incorporated by reference herein.

BACKGROUND OF THE INVENTION

Field of the Invention

The invention relates to a touch-control device and a method for determining keys of a virtual keyboard, and more particularly to a touch-control device and a method capable of improving the accuracy of recognizing which keys are pressed on a virtual keyboard.

Description of the Related Art

In recent years, a variety of electronic devices such as mobile phones, smartphones, personal digital assistants (PDAs), and Tablet PCs have been introduced onto the market, and the functions performed by these electronic devices have become increasingly diversified.

Typically, when using an electronic device, an input function is provided so that the user may input data. However, in order to reduce the size of the electronic device, the size of the keyboard with which the electronic device is equipped is often the first aspect that designers will adjust, or even remove to be replaced by a virtual keyboard. Therefore, more and more virtual keyboard-related technologies have been developed in recent years, as have the methods for improving virtual keyboard-related technologies.

In order to improve the recognition accuracy of virtual keyboards even further, the present application proposes a novel virtual keyboard architecture and a method for determining keys on a virtual keyboard. Besides improving recognition accuracy, use of the proposed virtual keyboard is more efficient than conventional designs.

BRIEF SUMMARY OF THE INVENTION

Touch-control devices and methods for determining keys on a virtual keyboard are provided. An exemplary embodiment of a touch-control device comprises a touch-control panel, a touch sensor and a central processor. The touch-control panel comprises a touch-control surface. The touch sensor senses a plurality of touched positions and at least one touch behavior on the touch-control surface. The central processor is coupled to the touch sensor, processes information regarding the touched positions and the touch behavior sensed by the touch sensor. The central processor determines positions of a plurality of control points and a plurality of basic keys of a virtual keyboard according to the touched positions sensed by the touch sensor, determines an input behavior of a user according to the touch behavior of at least one of the control points on the touch-control surface, and determines which key on the virtual keyboard is input by the user.

An exemplary embodiment of a method for determining keys on a virtual keyboard, suitable for a touch-control device comprising a touch-control surface, comprises: sensing positions of a plurality of control points on the touch-control surface to determine positions of a plurality of basic keys of a virtual keyboard; determining an input behavior of a user according to at least one touch behavior of at least one control point on the touch-control surface; and determining which key on the virtual keyboard is input by the user.

An exemplary embodiment of a method for determining keys of a virtual keyboard, suitable for a touch-control device comprising a touch-control surface, comprises: sensing positions of a plurality of control points on the touch-control surface to determine positions of a plurality of basic keys of the virtual keyboard; determining an input behavior of a user according to at least one touch behavior of at least one control point on the touch-control surface or at least one touch behavior of a touch point other than the control points on the touch-control surface; and determining which key on the virtual keyboard is input by the user.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
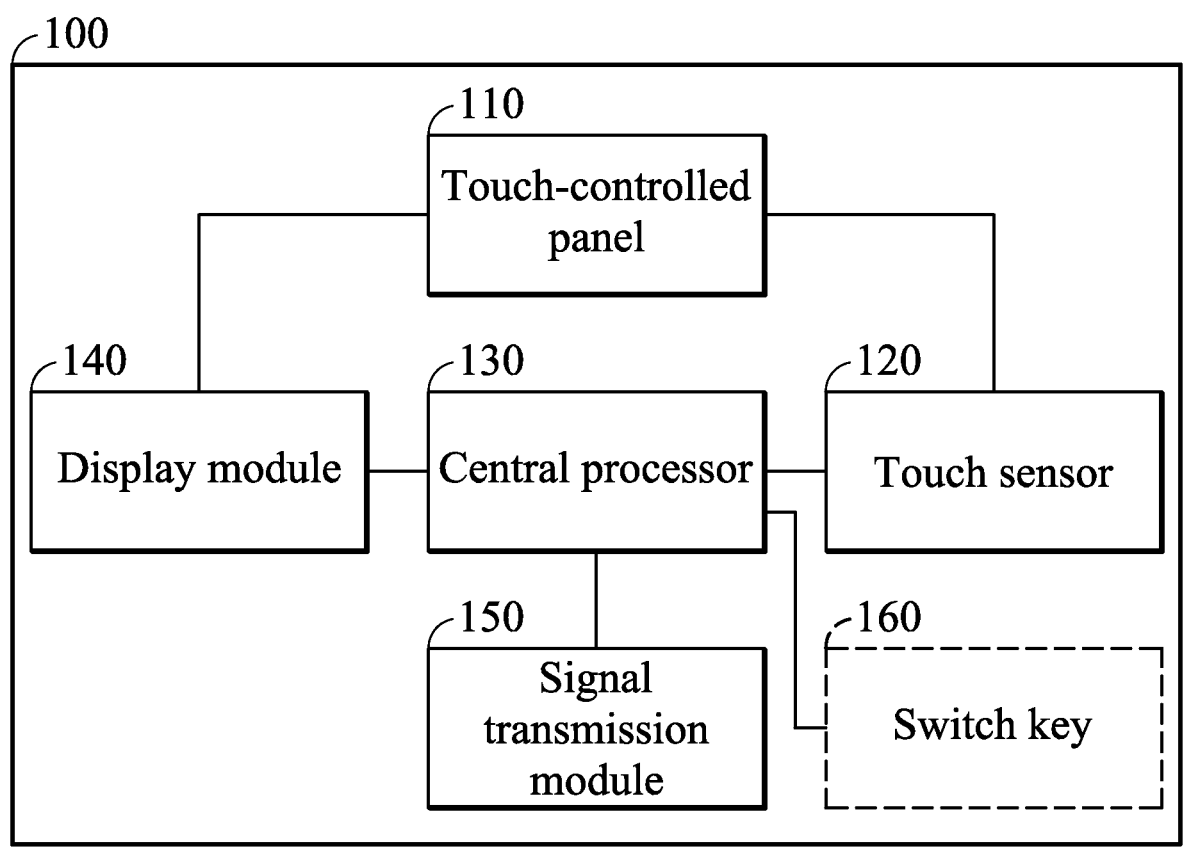
FIG. 1 shows a block diagram of a touch-control device according to an embodiment of the invention.

FIG. 1 shows a block diagram of a touch-control device according to an embodiment of the invention. According to an embodiment of the invention, the touch-control device 100 may at least comprise a touch-control panel 110, a touch sensor 120, a central processor 130, a display module 140 and a signal transmission module 150. According to an embodiment of the invention, the touch-control device 100 may be a mobile phone, a smartphone, a personal digital assistant (PDA), a tablet PC, a personal computer, a notebook, or any other electronic device. The touch-control panel 110 may comprise a touch-control surface (such as the touch-control surface 200 shown in FIG. 2 and/or the touch-control surface 800 shown in FIG. 8) capable of supporting multi-touch. The touch sensor 120 may senses a plurality of touched positions and at least one touch behavior on the touch-control surface of the touch-control panel 110, and may transmit information regarding the sensed touched positions and touched behavior to the central processor 130. The central processor 130 is coupled to the touch sensor 120 and the display module 140 for processing the information regarding the touched positions and touch behavior and processing information regarding the data to be displayed on the touch-control panel 110. The display module 140 is coupled to the central processor 130 and the touch-control panel 110 for driving the display function of the touch-control panel 110 and providing display data to the touch-control panel 110. The signal transmission module 150 is coupled to the central processor 130 for transmitting or receiving data or signals to or from an external electronic device in a wired or wireless manner. For example, the signal transmission module 150 may comprise one or more communication ports provided for connecting to one or more external electronic devices, or may comprise a wireless communication module to transmit data or signals in a wired or wireless manner.

Note that in order to clarify the concept of the invention, FIG. 1 presents a simplified block diagram, in which only the elements relevant to the invention are shown. Persons with ordinary skill in the art will understand that a touch-control device may further comprise more components that are not shown in FIG. 1. Therefore, the invention should not be limited what is shown in FIG. 1.

In the embodiments of the invention, novel virtual keyboard architecture and the corresponding method for determining keys of a virtual keyboard are carried out via the touched-controlled device shown in FIG. 1. Details of the proposed novel virtual keyboard architecture and the corresponding method for determining keys of a virtual keyboard are discussed in the following paragraphs.

According to an embodiment of the invention, when the touch sensor 120 senses that a plurality of control points touched on the touch-control surface of the touch-control panel 110, the touch sensor 120 may obtain the positions of the control points on the touch-control surface and transmit the information to the central processor 130. According to an embodiment of the invention, the control points may be generated when the user's fingers touch the touch-control surface of the touch-control panel 110. Therefore, in the embodiments of the invention, each control point may correspond to one finger of the user.

Figure 2:
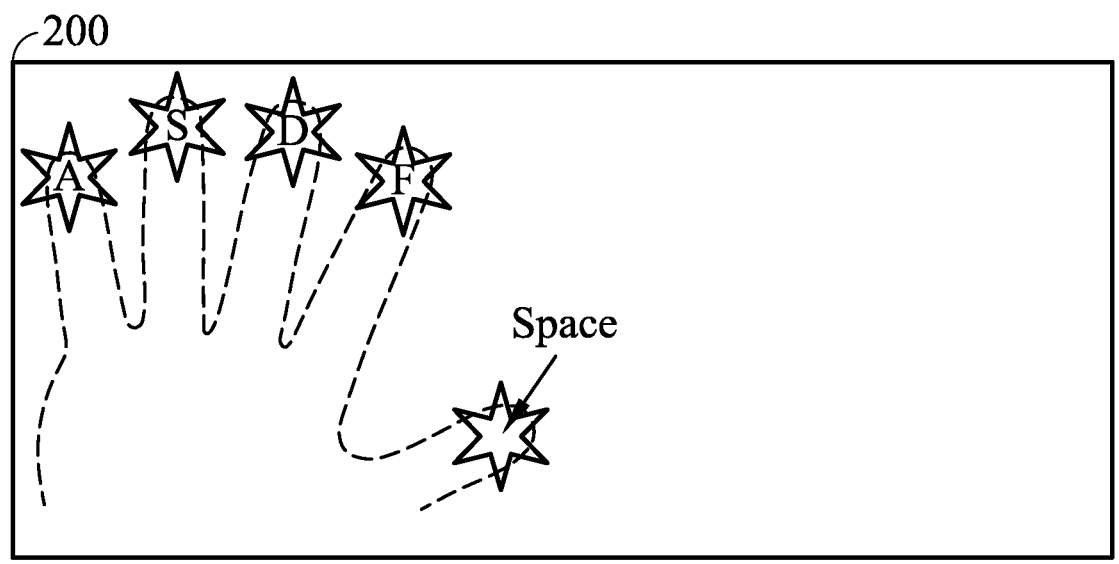
FIG. 2 is a schematic diagram showing the relationships between a plurality of control points and a plurality of basic keys according to an embodiment of the invention.

Next, the central processor 130 may determine positions of a plurality of basic keys and a plurality of control points according to the touched positions sensed by the touch sensor 120. FIG. 2 is a schematic diagram showing the relationships between a plurality of control points and a plurality of basic keys according to an embodiment of the invention. FIG. 2 shows a user touches the touch-control surface 200 of the touch-control panel via his five fingers of his left hand, so as to form five control points. The central processor 130 configures a corresponding basic key for each control point. For example, the 'A', 'S', 'D', 'F' and the 'space' keys from the left to the right. Note that in the embodiments of the invention, the basic keys are not limited to the 'A', 'S', 'D', 'F' and the 'space' keys. The user or system designer may also configure other keys as the basic keys of the virtual keyboard according to different preferences or requirements, and thus the invention should not be limited to what is shown in FIG. 2.

When the central processor 130 determines the positions of the basic keys on the touch-control surface, the central processor 130 may further determine the input behavior of the user according to subsequent touch behavior of at least one of the control points on the touch-control surface, and determine which key on the virtual keyboard is input by the user. According to an embodiment of the invention, the positions of the basic keys on the touch-control surface may be represented by absolute coordinates, relative coordinates, or by any other representation which can describe the configurations of the basic keys. In addition, besides the basic keys, since the virtual keyboard further comprises other virtual keys, such as the remaining letter keys, digit keys, or function keys that are comprised in a normal keyboard, in the embodiments of the invention, the central processor 130 may further determine which key on the virtual keyboard is input by the user according to a position of the touch behavior of a control point or a touch point other than the control points (which will be further illustrated in the following paragraphs) on the touch-control surface or according to at least one vector generated based on the position of the touch behavior with respect to a position of the basic key. Here, the vector may comprise a variety of information, such as distance, direction, and/or the angle between the position of the touch behavior and the position of the basic key.

In other words, in the embodiments of the invention, via the configurations of a plurality of basic keys, the positions of other virtual keys of the virtual keyboard may be defined accordingly. In addition, the positions of the basic keys and the other virtual keys may also be dynamically and flexibly adjusted according to different parameters such as the user's habits, the size of user's hands, or other, for providing a more convenient input interface for the user.

Figure 3A:
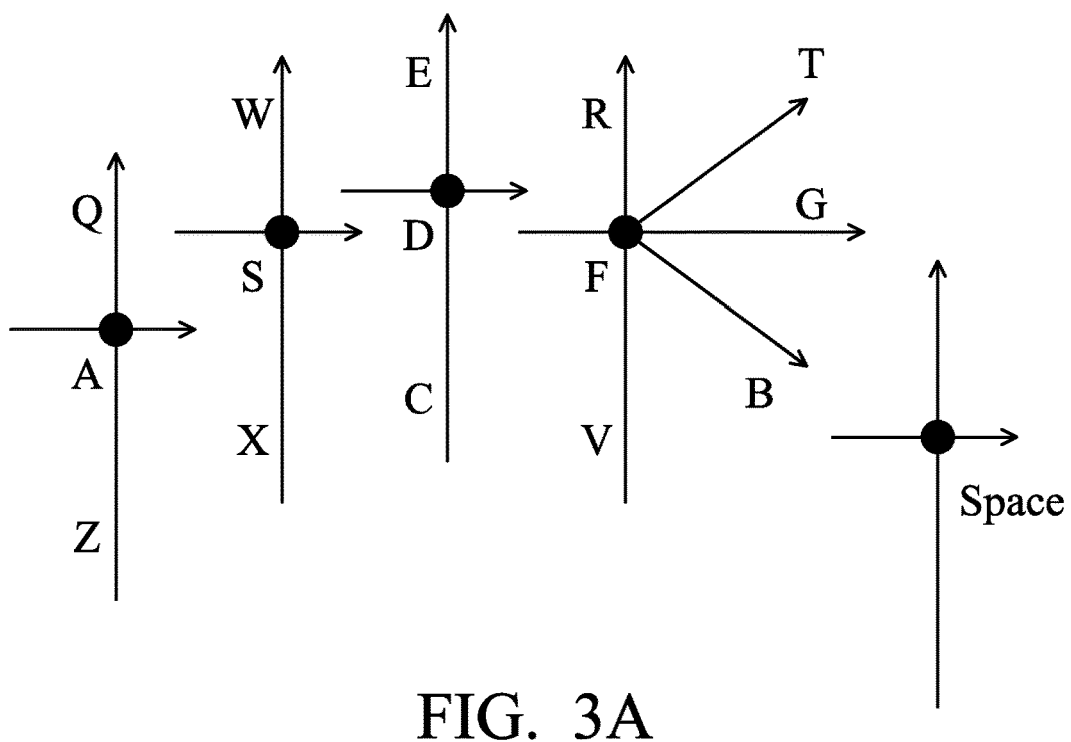
FIG. 3A shows the configurations of multiple keys of a virtual keyboard according to an embodiment of the invention.
Figure 3B:
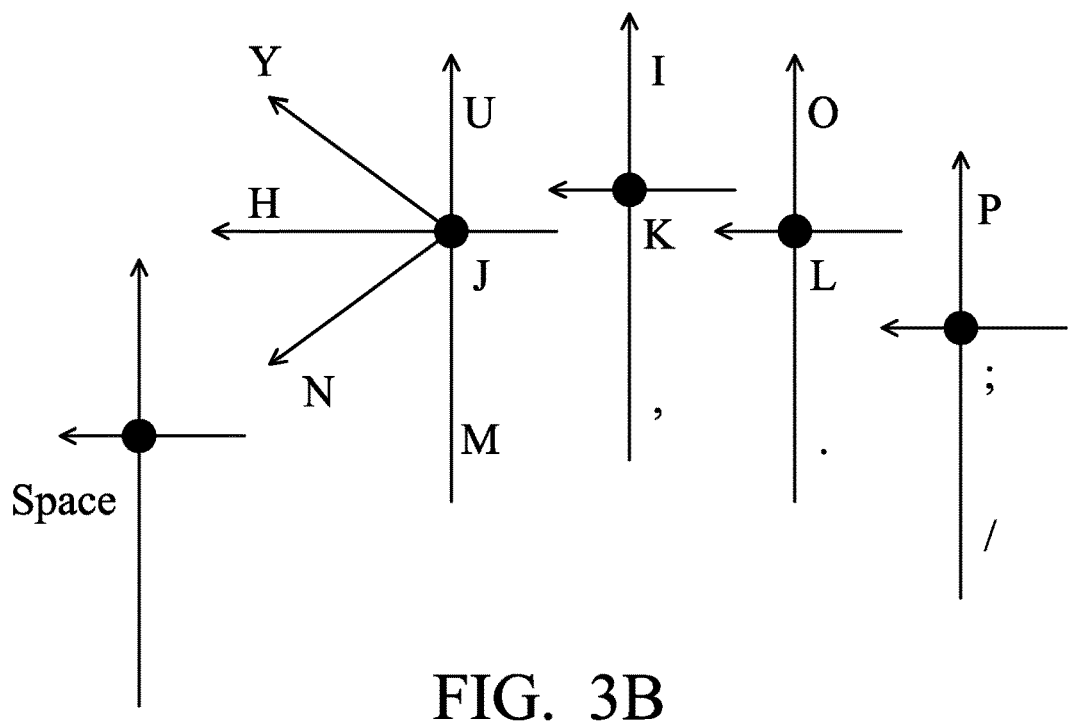
FIG. 3B shows the configurations of multiple keys of a virtual keyboard according to an embodiment of the invention.

FIG. 3A and FIG. 3B show configurations of multiple keys on a virtual keyboard according to an embodiment of the invention. FIG. 3A shows the configurations of multiple keys on the left-hand side of the virtual keyboard and FIG. 3B shows the configurations of multiple keys on the right-hand side of the virtual keyboard. In the embodiment, the central processor 130 may first locate the positions of the basic keys: 'A', 'S', 'D', 'F', 'K', ';' and the 'space' key by recognizing the positions of the five fingers of the user's right hand and the five fingers of the user's left hand, and then locate the positions of the remaining virtual keys, such as the 'Q', 'W', 'B', . . . etc. For example, the position of the key 'Q' may be located in the region that is 1 cm above the position of the basic key 'A', the position of the key 'W' may be located in the region that is 1 cm above the position of the basic key 'S', and so on.

According to an embodiment of the invention, besides the basic keys, the central processor 130 may further configure multiple virtual keys for each control point, which means that each control point may be used to represent the input or the pressing of at least one basic key and at least one virtual key. When a control point generates the subsequent touch behavior on the touch-control surface, the touch behavior may represent the basic key or the reference key corresponding to the control point being input by the user. For example, take FIG. 3A as an example, the control point corresponding to the little finger of the user's left hand may control the input of keys 'Q', 'A' and 'Z', and the ring finger of the user's left hand may control the input of keys 'W', 'S' and 'X', and so on.

Note that, in different embodiments of the invention, the positioning of the basic keys of the virtual keyboard is not limited to the five-finger positioning as illustrated above, and may also be four-finger positioning, three-finger positioning or two-finger positioning. Therefore, according to an embodiment of the invention, the number of control points is 2-10.

Figure 4A:
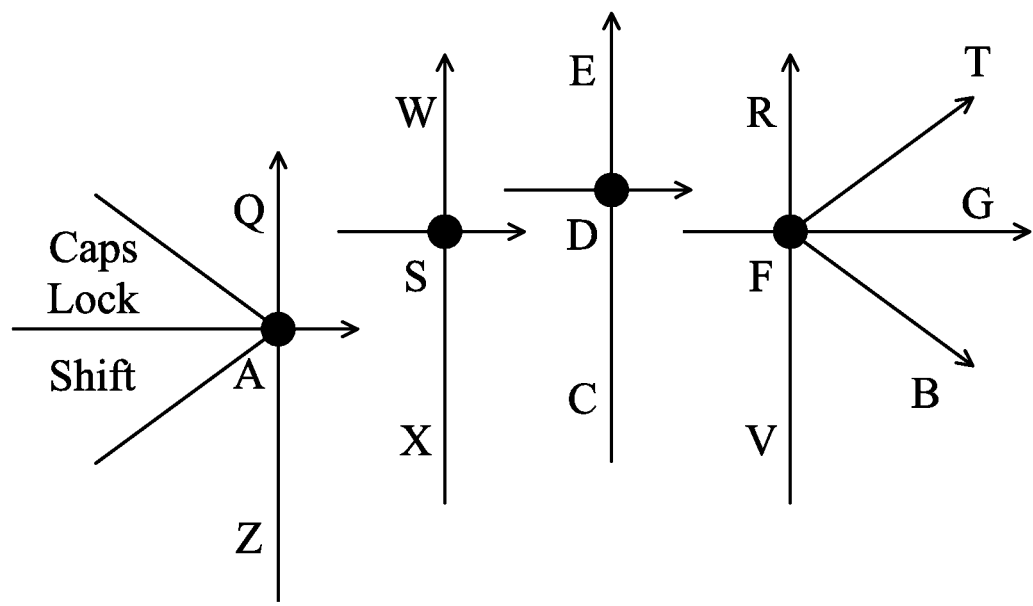
FIG. 4A shows the configurations of multiple keys of a virtual keyboard according to another embodiment of the invention.
Figure 4B:
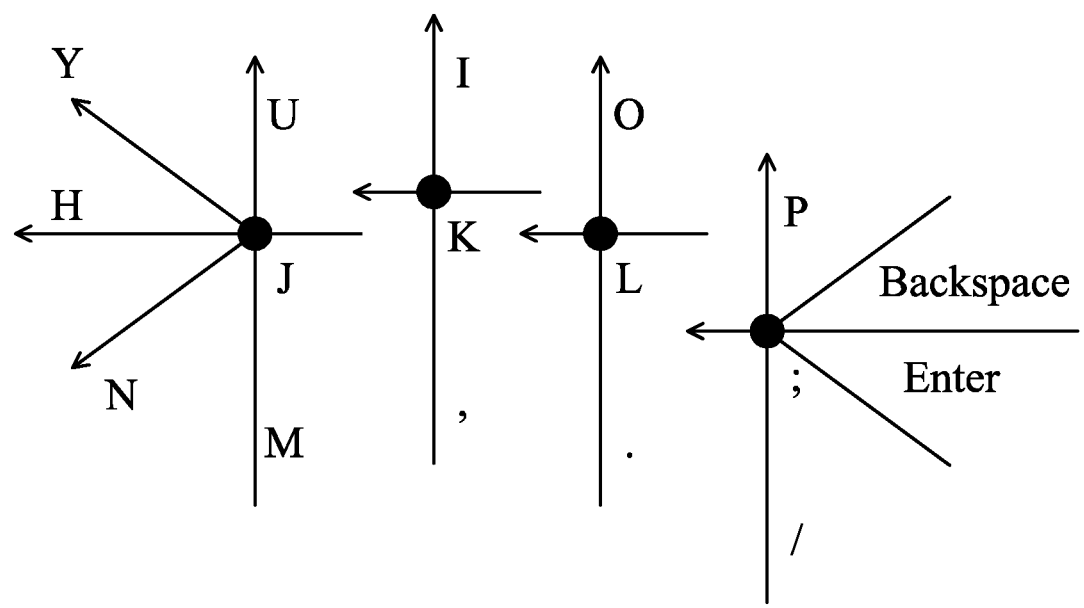
FIG. 4B shows the configurations of multiple keys of a virtual keyboard according to another embodiment of the invention.

FIG. 4A and FIG. 4B show configurations of multiple keys on a virtual keyboard according to another embodiment of the invention. FIG. 4A shows the configurations of multiple keys on the left-hand side of the virtual keyboard and FIG. 4B shows the configurations of multiple keys on the right-hand side of the virtual keyboard. In this embodiment, the central processor 130 may first locate the positions of the basic keys: 'A', 'S', 'D', 'F', 'J,' 'K', 'L' and ';' by recognizing the positions of four fingers of the user's right hand and four fingers of the user's left hand, and then locate the positions of the remaining virtual keys, such as the 'Q', 'W', 'B', . . . etc. For example, the position of the key 'Q' may be located in the region that is 1 cm above the position of the basic key 'A' and within the 135°-180° angle range from the X-axis of the coordinates when the basic key 'A' is regarded as an origin, and so on.

In addition, as discussed above, besides the basic keys, the central processor 130 may also configure multiple virtual keys for each control points, which means that each control point may be used to represent the input or the pressing of at least one basic key and multiple virtual keys. For example, take FIG. 4A as an example, the control point corresponding to the little finger of the user's left hand may control the input of the keys 'Q', 'A', 'Z', 'Caps Lock', 'Shift' and the ring finger of the user's left hand may control the input of the keys 'W', 'S' and 'X', and so on. Regarding the remaining keys, such as the 'Space' key, the central processor 130 may configure them to the touch points (for example, the touch point generated by the finger that is not used for positioning the basic keys) other than the control points. When a touch behavior of any touch point other than the control points is sensed, the central processor 130 may further determine which key corresponds to the touch point (a more detailed discussion will be given in the following paragraphs).

Figure 5A:
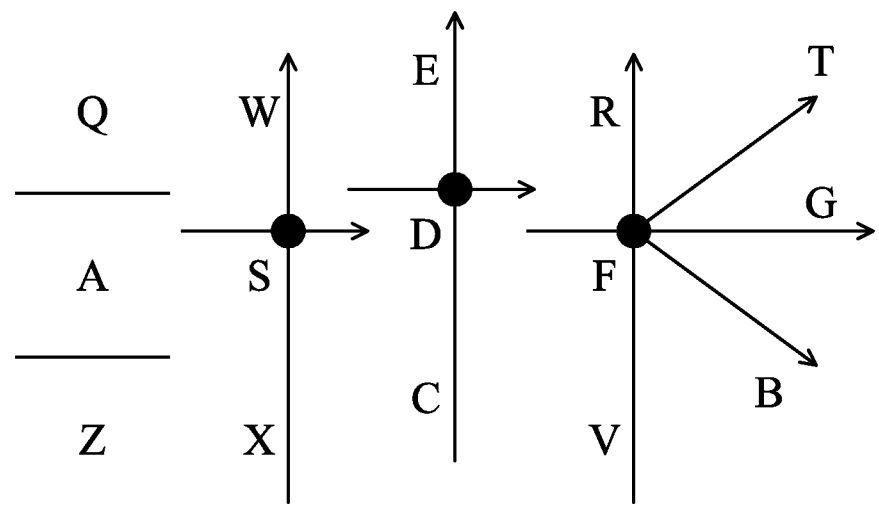
FIG. 5A shows the configurations of multiple keys of a virtual keyboard according to yet another embodiment of the invention.
Figure 5B:
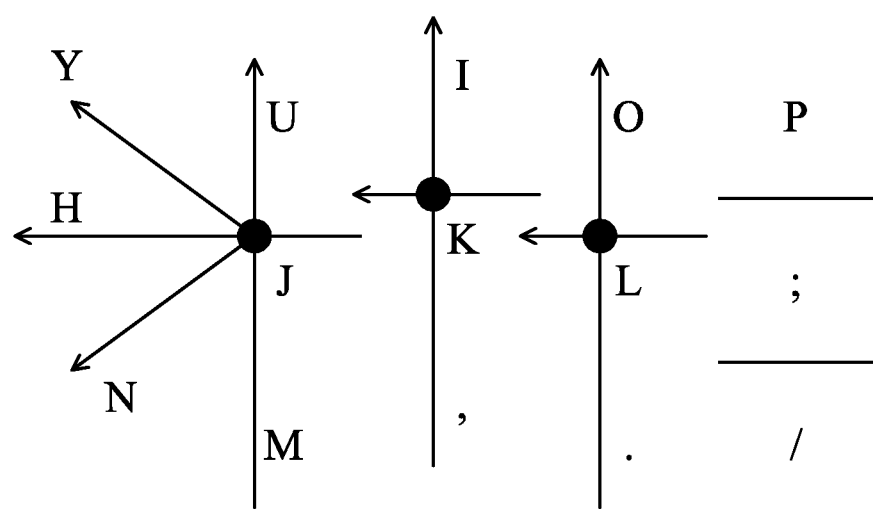
FIG. 5B shows the configurations of multiple keys of a virtual keyboard according to yet another embodiment of the invention.

FIG. 5A and FIG. 5B show configurations of multiple keys on a virtual keyboard according to yet another embodiment of the invention. FIG. 5A shows the configurations of multiple keys on the left-hand side of the virtual keyboard and FIG. 5B shows the configurations of multiple keys on the right-hand side of the virtual keyboard. In this embodiment, the central processor 130 may first locate the positions of the basic keys: 'S', 'D', 'F', 'J,' 'K' and 'L' by recognizing the positions of three fingers of the user's right hand and three fingers of the user's left hand, and then locate the positions of the remaining virtual keys, such as the 'R', 'W', 'B', . . . etc. For example, the position of the key 'W' may be located in the region that is 1 cm above the position of the basic key 'S', the position of the key 'E' may be located in the region that is 1 cm above the position of the basic key 'D', and so on.

In addition, as discussed above, besides the basic keys, the central processor 130 may also configure multiple virtual keys for each control points, which means that each control point may be used to represent the input or the pressing of at least one basic key and multiple virtual keys. For example, take FIG. 5A as an example, the control point corresponding to the ring finger of the user's left hand may control the input of the keys 'W', 'S' and 'X', the control point corresponding to the middle finger of the user's left hand may control the input of the keys 'E', 'D' and 'C', and so on. Regarding the remaining keys, such as the 'Q', 'A' and 'Z', the central processor 130 may configure them to the touch points (for example, the touch point generated by the finger that is not used for positioning the basic keys) other than the control points. When a touch behavior of any touch point other than the control points is sensed, the central processor 130 may further determine which key corresponds to the touch point (a more detailed discussion will be given in the following paragraphs).

Figure 6A:
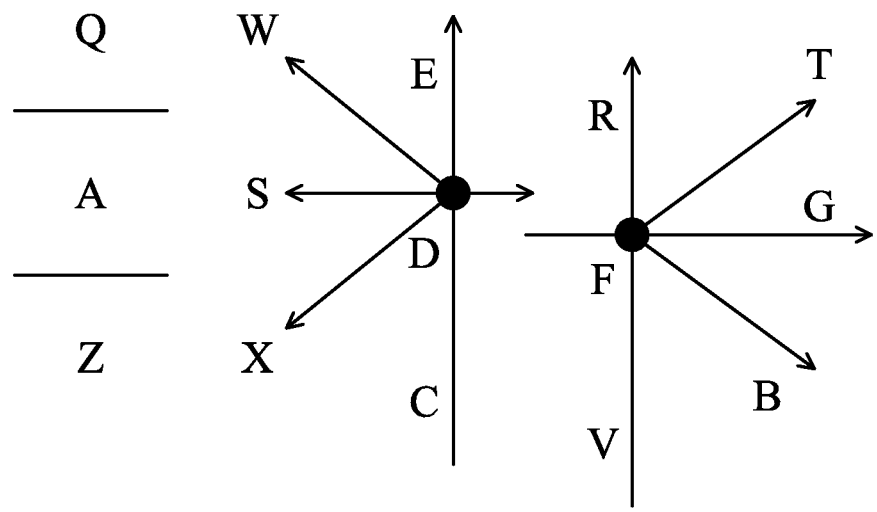
FIG. 6A shows the configurations of multiple keys of a virtual keyboard according to yet another embodiment of the invention.
Figure 6B:
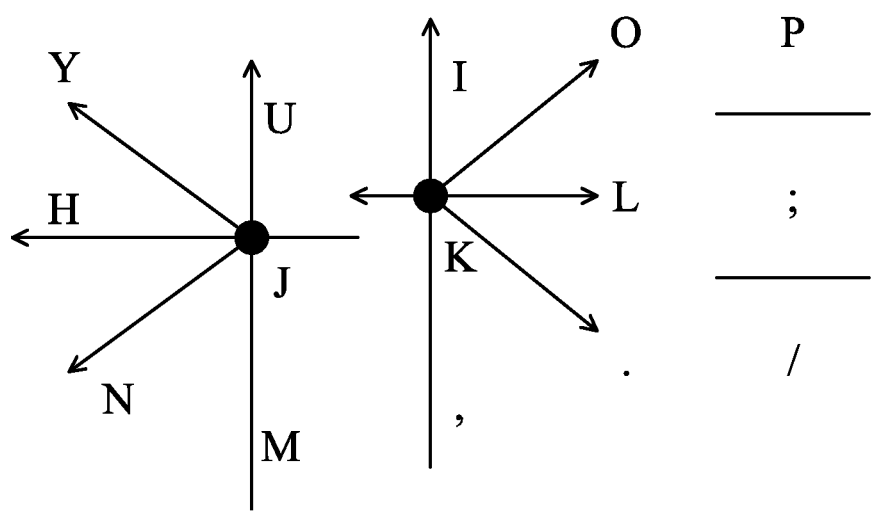
FIG. 6B shows the configurations of multiple keys of a virtual keyboard according to yet another embodiment of the invention.

FIG. 6A and FIG. 6B show configurations of multiple keys on a virtual keyboard according to yet another embodiment of the invention. FIG. 6A shows the configurations of multiple keys on the left-hand side of the virtual keyboard and FIG. 6B shows the configurations of multiple keys on the right-hand side of the virtual keyboard. In this embodiment, the central processor 130 may first locate the positions of the basic keys: 'D', 'F', 'J' and 'K' by recognizing the positions of two fingers of the user's right hand and two fingers of the user's left hand, and then locate the positions of the remaining virtual keys, such as the 'E', 'R', 'T', . . . etc. For example, the position of the key 'E' may be located in the region that is 1 cm above the position of the basic key 'D' and within the 0°-120° angle range from the X-axis of the coordinates when the basic key 'D' is regarded as an origin, the position of the key 'W' may be located in the region that is 1 cm above the position of the basic key 'D' and within the 120°-150° angle range from the X-axis of the coordinates when the basic key 'D' is regarded as an origin, and so on.

In addition, as discussed above, besides the basic keys, the central processor 130 may also configure multiple virtual keys for each control points, which means that each control point may be used to represent the input or the pressing of at least one basic key and multiple virtual keys. For example, take FIG. 6A as an example, the control point corresponding to the middle finger of the user's left hand may control the input of the keys 'E', 'D', 'C', 'W', 'S' and 'X', the control point corresponding to the index finger of the user's left hand may control the input of the keys 'R', 'F', 'V', 'T', 'G' and 'B', and so on. Regarding the remaining keys, such as the 'Q', 'A' and 'Z', the central processor 130 may configure them to the touch points (for example, the touch point generated by the finger that is not used for positioning the basic keys) other than the control points. When a touch behavior of any touch point other than the control points is sensed, the central processor 130 may further determine which key corresponds to the touch point (a more detailed discussion will be given in the following paragraphs).

Note that the configurations of the basic keys and virtual keys for each control point and the positioning methods for each basic key and virtual key as illustrated above are just some of a variety of possible implementations of the invention and are merely utilized to clarify the concept of the invention. Therefore, the invention should not be limited thereto.

Figure 7A:
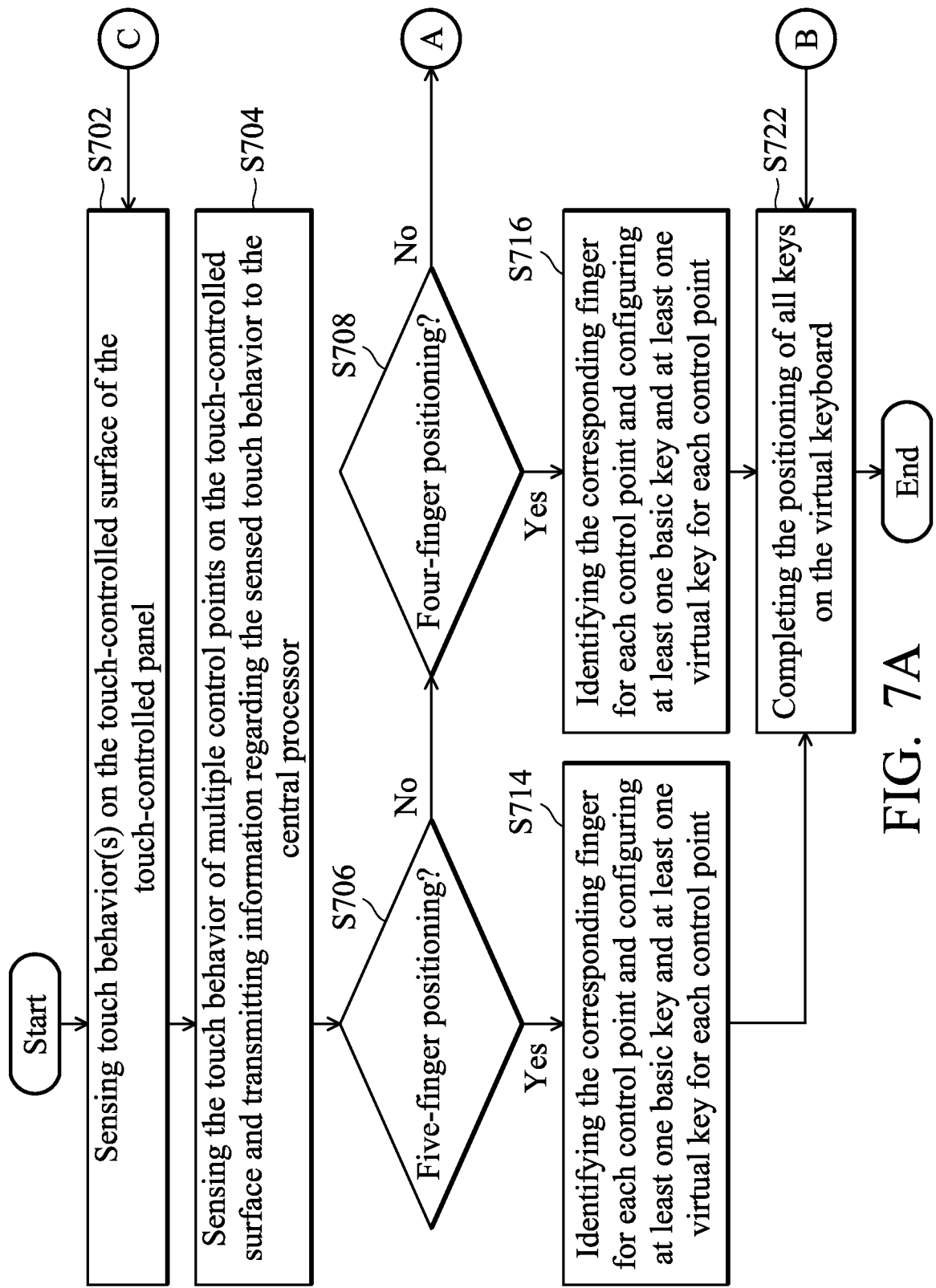
FIG. 7A and FIG. 7B together show the flow chart of multi-finger positioning method according to an embodiment of the invention.
Figure 7B:
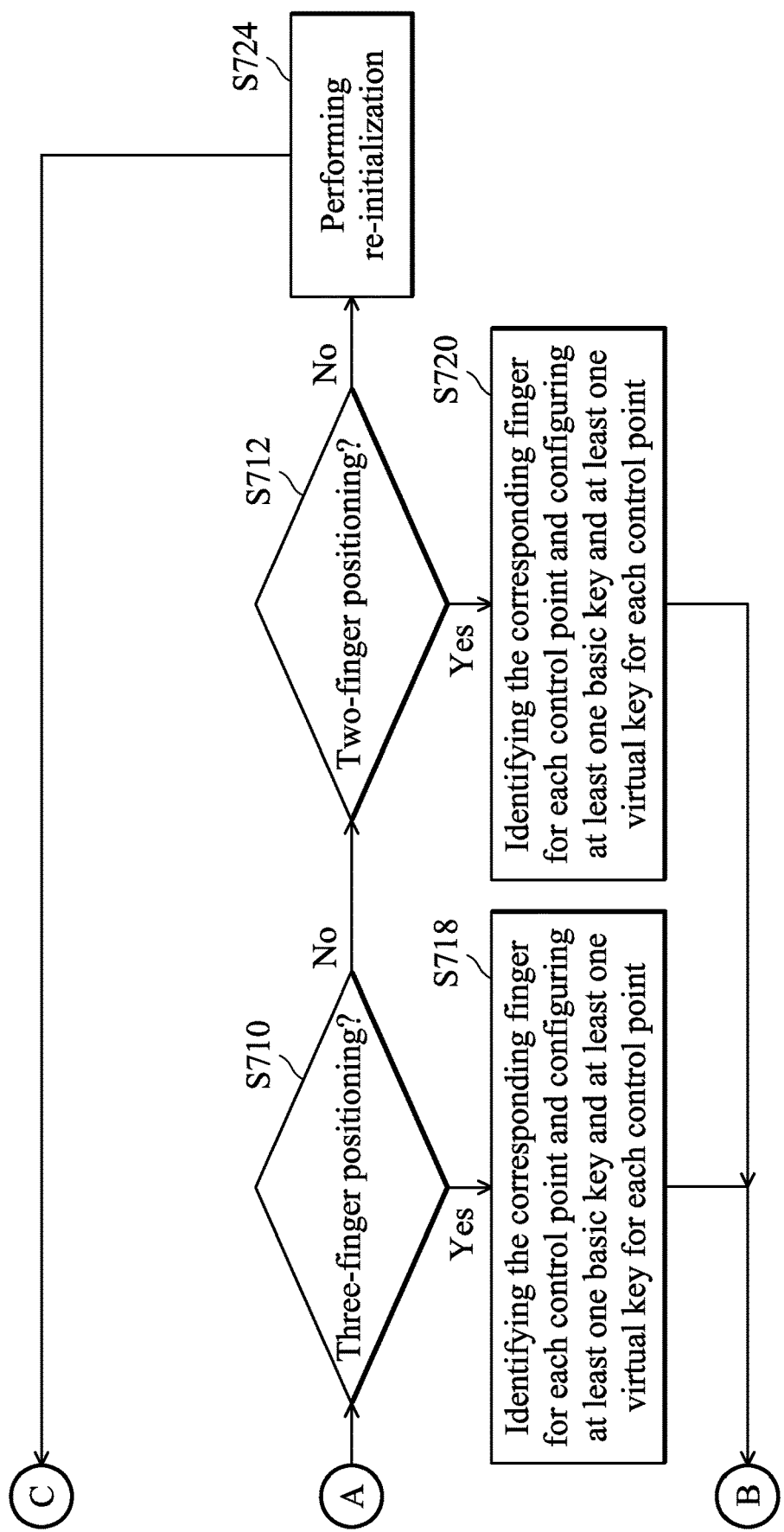

FIG. 7A and FIG. 7B together show the flow chart of a multi-finger positioning method according to an embodiment of the invention. First of all, the touch sensor 120 keeps sensing touch behavior(s) on the touch-control surface of the touch-control panel (step S702). Next, when the touch sensor 120 senses the touch behavior of multiple control points on the touch-control surface, information regarding the sensed touch behavior is transmitted to the central processor 130 (step S704). Next, the central processor 130 may determine whether the user performs five-finger positioning (step S706), four-finger positioning (step S708), three-finger positioning (step S710) or two-finger positioning (step S712) according to the received information. For example, the central processor 130 may determine how many fingers are utilized by the user for performing positioning according to the number of control points sensed by the touch sensor 120.

When the central processor 130 determines how many fingers are utilized by the user for performing positioning, the central processor 130 may identify the corresponding finger for each control point, and may further configure at least one basic key and a least one virtual key for each control point (steps S714, S716, S718 and S720). Finally, the central processor 130 may complete the positioning of all keys on the virtual keyboard (step S722). For example, the central processor 130 may further configure the remaining key(s) for the touch point(s) other than the control points. On the other hand, when the central processor 130 is unable to determine how many fingers are utilized by the user for performing positioning, the central processor 130 may determine to re-initialize (step S724) and the process returns to step S702 for the touch sensor 120 to keep sensing touch behavior(s) on the touch-control surface of the touch-control panel.

According to an embodiment of the invention, when the central processor 130 completes the positioning of all keys on the virtual keyboard, the central processor 130 may further determine whether to display the position of each key according to user's preference setting. For example, the central processor 130 may provide information regarding the positions of all keys on the virtual keyboard to the display module 140, and the display module 140 may trigger the touch-control panel 110 to display the keys at the corresponding positions on the touch-control panel 110, such as the way to display the keys as shown in FIG. 3A and FIG. 3B.

In addition, since the user usually uses both hands to perform positioning and/or input, in an embodiment of the invention, the display module 140 may display at least one indication line in the middle of the touch-control panel 110 to separate the left-hand side and right-hand side of the virtual keyboard.

Figure 8:
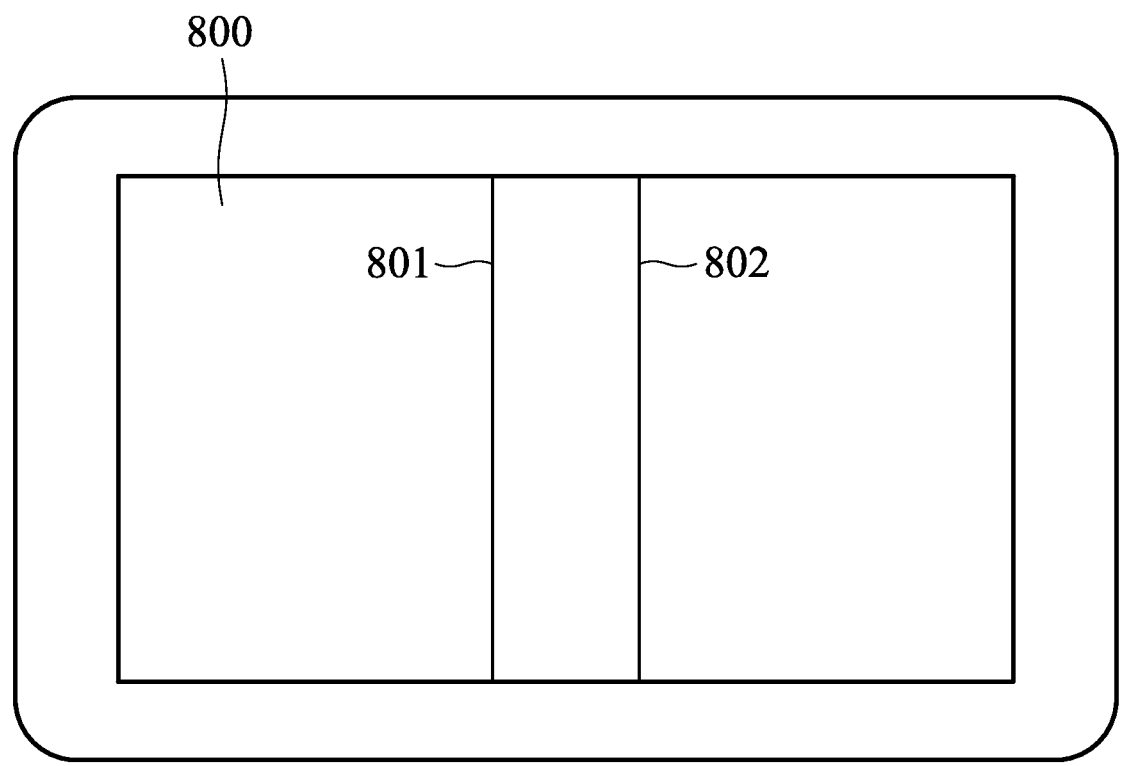
FIG. 8 shows an exemplary appearance of the touch-control device according to an embodiment of the invention.

FIG. 8 shows an exemplary appearance of the touch-control device according to an embodiment of the invention. As shown in FIG. 8, there are two indication lines 801 and 802 displayed on the touch-control surface to separate the left-hand side and right-hand side of the virtual keyboard. The indication lines 801 and 802 may further be utilized to indicate the user to put his left hand on the left side of the indication line 801 and put his right hand on the right side of the indication line 802. In this manner, the central processor 130 may simply distinguish the operations between the left and right hands of the user.

Figure 9:
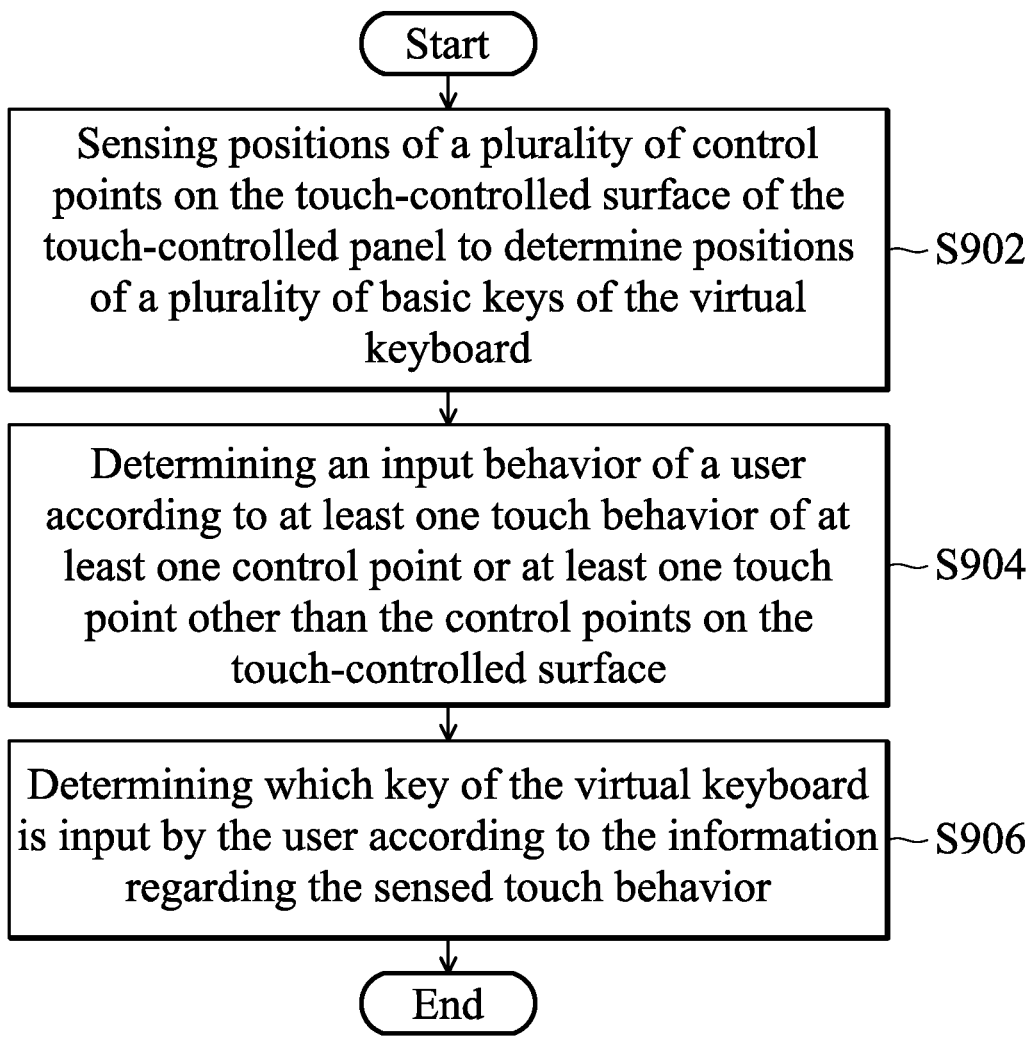
FIG. 9 is a flow chart showing the method for determining keys of a virtual keyboard according to an embodiment of the invention.

FIG. 9 is a flow chart showing the method for determining keys of a virtual keyboard according to an embodiment of the invention. First of all, the touch sensor 120 senses positions of a plurality of control points on the touch-control surface of the touch-control panel for the central processor 130 to determine positions of a plurality of basic keys of the virtual keyboard (step S902). Next, the central processor 130 may determine the input behavior of a user according to at least one touch behavior of at least one control point or at least one touch point other than the control points on the touch-control surface (step S904). Finally, the central processor 130 may determine which key on the virtual keyboard is input by the user according to the information regarding the sensed touch behavior (step S906).

According to an embodiment of the invention, when the user uses the virtual keyboard to input or key-in data, the user may keep placing the fingers utilized for positioning the basic keys on the touch-control panel as using a physical keyboard. However, note that in other embodiments of the invention, the system may also be designed for the user does not have to keep placing his fingers utilized for positioning the basic keys on the touch-control panel. Therefore, the invention should not be limited to any specific implementation method.

In addition, in one embodiment of the invention, the subsequent touch behavior of the control point or touch point on the touch-control surface may comprise any of a move, slide, tap and click on the touch-control surface. For example, the user may use the fingers utilized for positioning the basic keys and/or the finger(s) not utilized for positioning the basic keys to move, slide, tap or click on the touch-control surface to input or key-in data (that is, corresponding to the press or tap operations on the physical keyboard).

In addition, in the embodiments of the invention, when the central processor 130 determines which key of the virtual keyboard is input or pressed by the user, the central processor 130 may first determine which control point or which touch point (or, may be regarded as which finger of the user) the touch behavior is performed by, and then select one from the limited basic key and/or the virtual key configured for the determined control point or touch point as the key input by the user. In this manner, the probability of erroneous judgement can be greatly reduced. Note that in the embodiments of the invention, the basic key and the virtual key configured by the central processor 130 for each control point are different.

In addition, in the embodiments of the invention, after determining which control point the touch behavior is performed by, the central processor 130 may further select one from the basic key and virtual key configured for the determined control point as the key pressed or input by the user according to a position of the touch behavior on the touch-control surface or according to at least one vector generated based on the position of the touch behavior with respect to a position of the basic key configured for the determined control point. Here, the vector may comprise a variety of information, such as distance, direction, and/or the angle between the position of the touch behavior and the position of the basic key. Or, when the central processor 130 determines that the touch behavior is performed by a touch point other than the control points, the central processor 130 may further determine which key of the virtual keyboard is pressed or input by the user according to a position of the touch behavior of the touch point on the touch-control surface or according to at least one vector generated based on the position of the touch behavior with respect to a position of the basic key configured for a control point which is adjacent to the touch point. Here, the vector may comprise a variety of information, such as distance, direction, and/or the angle between the position of the touch behavior and the position of the basic key.

Figure 10A:
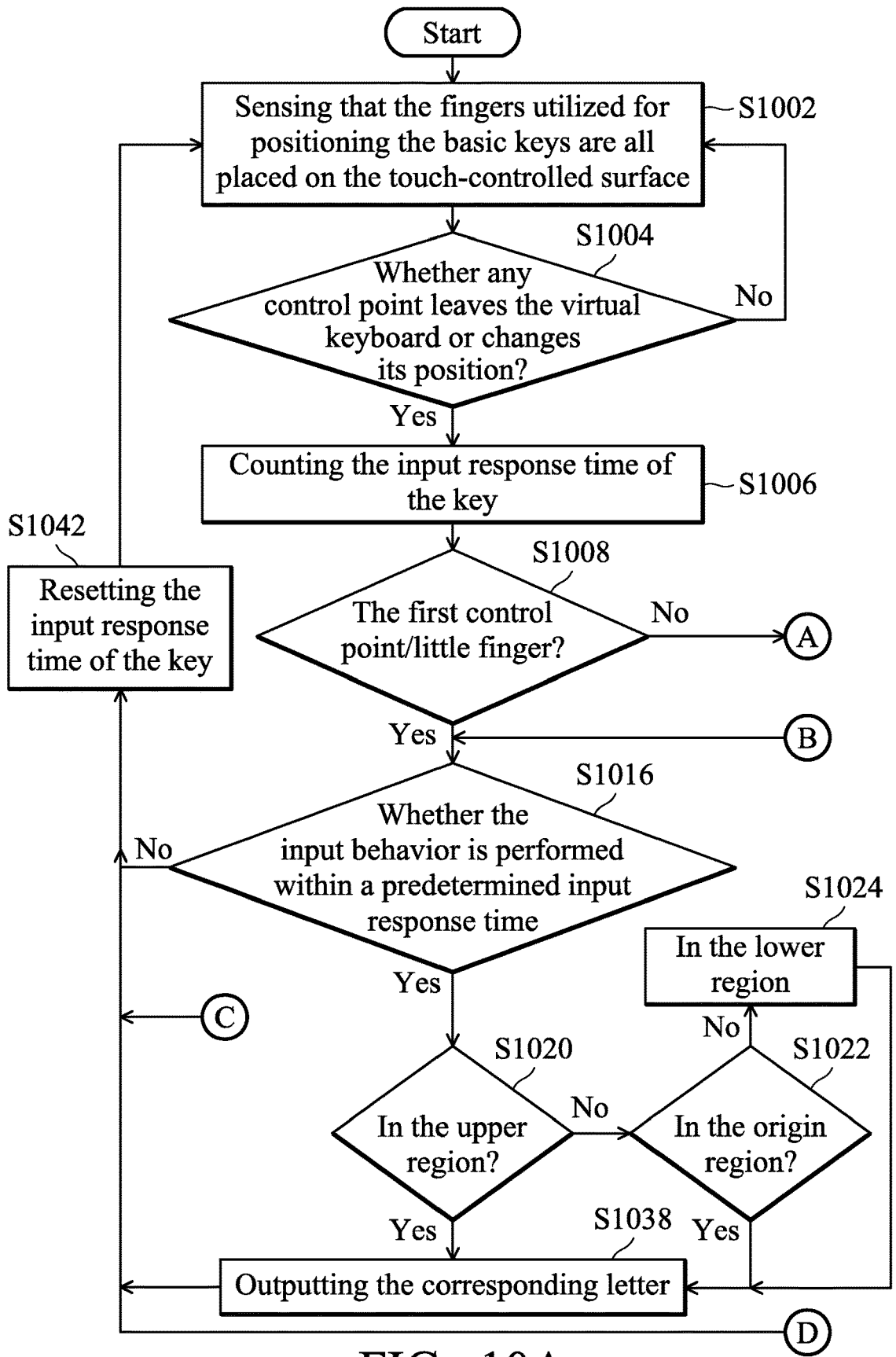
FIG. 10A, FIG. 10B and FIG. 10C together show a more detailed flow chart of a method for determining keys of a virtual keyboard according to an embodiment of the invention.
Figure 10B:
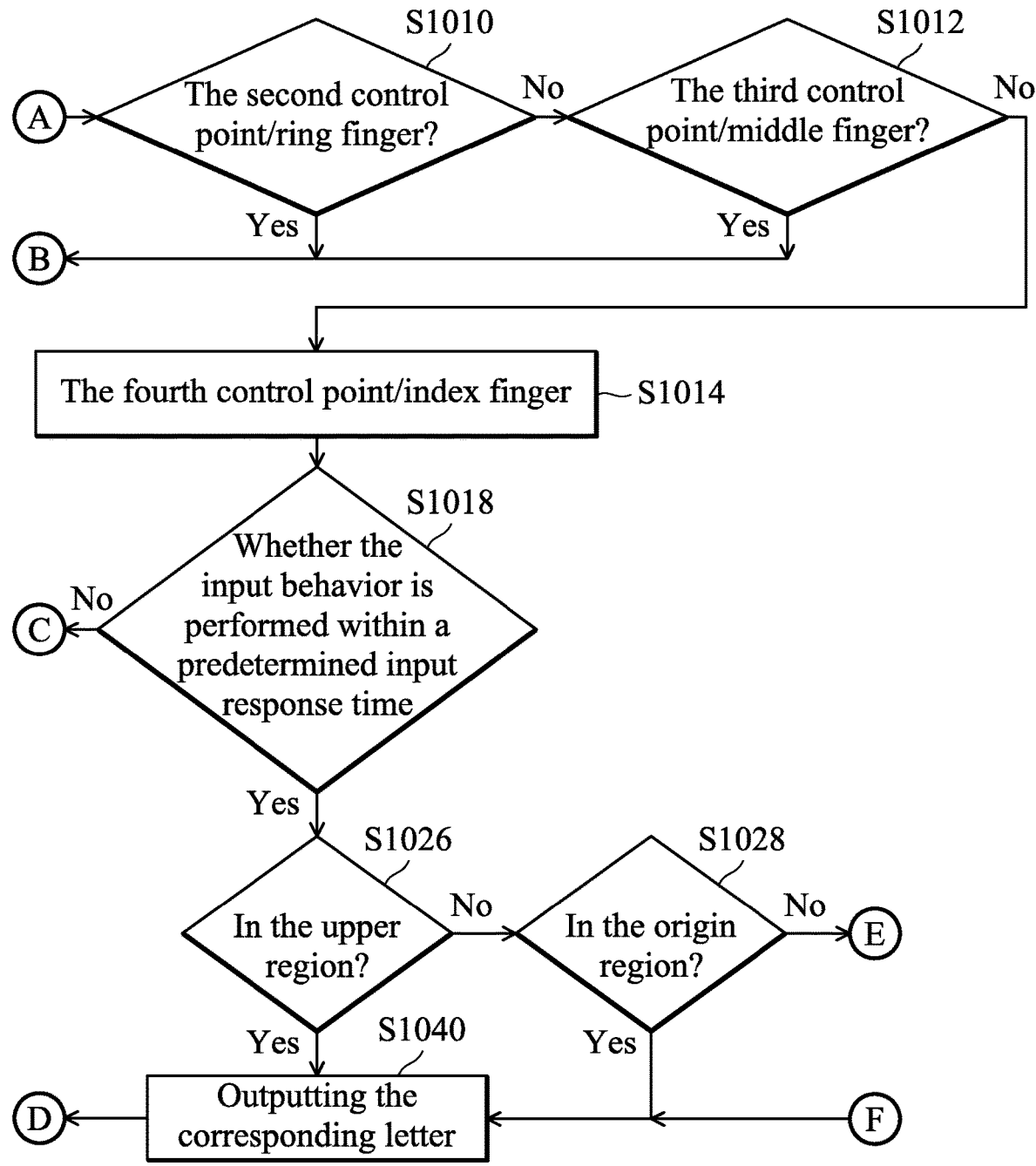
Figure 10C:
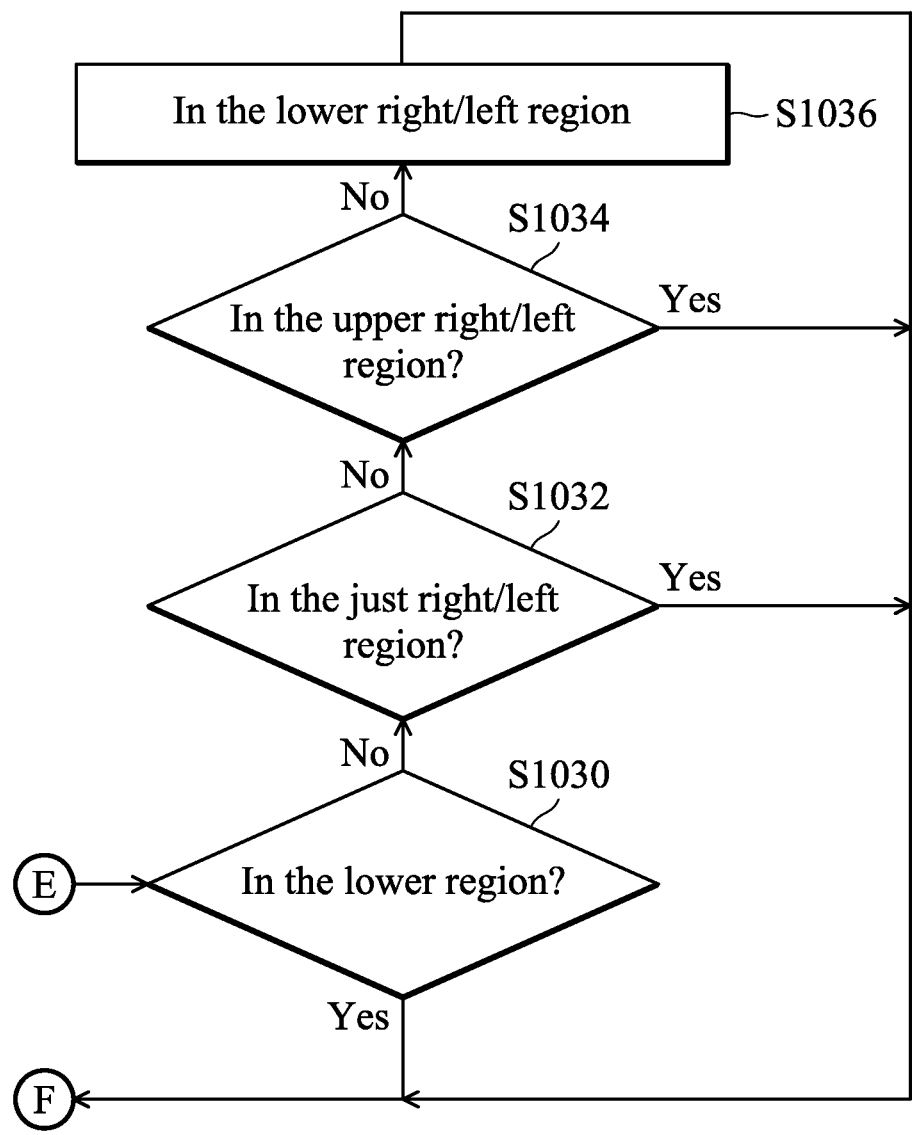

FIG. 10A, FIG. 10B and FIG. 10C together show a more detailed flow chart of a method for determining keys of a virtual keyboard according to an embodiment of the invention. First of all, the touch sensor 120 keeps sensing that the fingers utilized for positioning the basic keys are all placed on the touch-control surface of the touch-control panel (step S1002). For example, the fingers utilized for positioning the basic keys are all placed on the positions of the corresponding basic keys to form the control points as discussed above. Next, the central processor 130 determines whether any control point leaves the virtual keyboard or changes its position (step S1004). If not, the process returns to step S1002. If yes, the central processor 130 starts counting the input response time of the key (step S1006), and identifying which control point or which finger leaves the virtual keyboard or changes its position (steps S1008, S1010 and S1014). In this embodiment, the user uses his four fingers for positioning the basic keys. Therefore, the control points can be the first to the fourth control points of user's left hand or right hand, or the little finger, the ring finger, the middle finger or the index finger of user's left hand or right hand.

After the central processor 130 identifies which control point or finger leaves the virtual keyboard or changes its position, the central processor 130 further determines whether the control point or finger performs the input behavior within a predetermined input response time (steps S1016 and S1018). As discussed above, the input behavior of the control point or finger can be the touch behavior on the touch-control surface, such as any of a move, slide, tap and click on the touch-control surface. According to an embodiment of the invention, the predetermined input response time may be set to, for example, 0.2 seconds.

When the control point or finger is unable to perform the input behavior with the predetermined input response time, the central processor 130 resets the input response time of the key (step S1042) after sensing that the fingers utilized for positioning the basic keys are all placed on the touch-control surface of the touch-control panel and the process returns to step S1002.

When the control point or finger is able to perform the input behavior with the predetermined input response time, the central processor 130 further determines whether the position of the touch behavior of the control point on the touch-control surface is located in the upper region, the origin region or the lower region (steps S1020, S1022 and S1024, or the steps S1026, S1028 and S1030).

According to an embodiment of the invention, the origin region of a basic key may be set as a region which's center is located at the position of the basic key and has a radius of 1 cm, and the upper/lower region of the basic key may be set as the upper/lower region which is 1 cm above/below an X-axis across the origin. Note that the setting discussed above is only an example for illustrating the concept of the invention. The region can be flexibly adjusted according to the user's habits. Therefore, the invention should not be limited thereto. The concepts of the origin, Y-axis, X-axis of a basic key may refer to the coordinates of each basic key shown in FIG. 3A and FIG. 3B. Note that the definitions of the upper region, origin region or lower region are merely an embodiment of the invention, and are not used to limit the scope of the invention.

In the embodiment of the invention, since the central processor 130 configures more virtual keys for the index finger than the other fingers, such as the configuration shown in FIG. 3A and FIG. 3B, when the central processor 130 identifies that the fourth control point or the index finger leaves the keyboard or changes its position, the central processor 130 may determine whether the position of the touch behavior on the touch-control surface is located in the just right/left region of the basic key configured for the control point (step S1032), the upper right/left region (step S1034) or lower right/left region (step S1036) of the basic key configured for the control point. After the central processor 130 identifies the relationship between the location of the touch behavior and the corresponding basic key, the central processor 130 may output the corresponding letter according to the relationship (steps S1038 and S1040). After sensing that the fingers utilized for positioning the basic keys are all placed on the touch-control surface of the touch-control panel, the central processor 130 resets the input response time of the key (step S1042) and the process returns to step S1002.

According to an embodiment of the invention, the central processor 130 may determine whether the touch behavior performed by the user is to press or input a key or place his finger back to the position of the basic key according to the time duration of the touch behavior of the finger. For example, a short press may indicate that the user wants to press or input a key and a long press may indicate that the user wants to place his finger back onto the position of the basic key. In the latter case, the process returns to step S1002. Therefore, the central processor 130 may further set a predetermined touch time threshold, such as 2 seconds. When the time duration of the touch behavior of the control point or the finger is longer than the predetermined touch time threshold, the central processor 130 does not take the touch behavior as the input behavior of the user, and take the touch behavior as the user wants to place his finger back onto the position of the basic key.

In addition, according to an embodiment of the invention, when the central processor 130 detects that the two hands of the user completely leave the touch-control panel for a while and then are put back onto the touch-control panel, the central processor 130 may take this action as the user wants to re-configure the basic keys and virtual keys of the virtual keyboard. Therefore, the central processor 130 may perform multi-finger positioning as the flow shown in FIG. 7A and FIG. 7B, again. In addition, in an embodiment of the invention, the central processor 130 may further set a predetermined positioning response time, for example, 5 seconds. When the time duration for the user puts his two hands back onto the touch-control panel exceeds the predetermined positioning response time, the central processor 130 may take the action as the user wants to re-configure the basic keys and virtual keys of the virtual keyboard.

Figure 11:
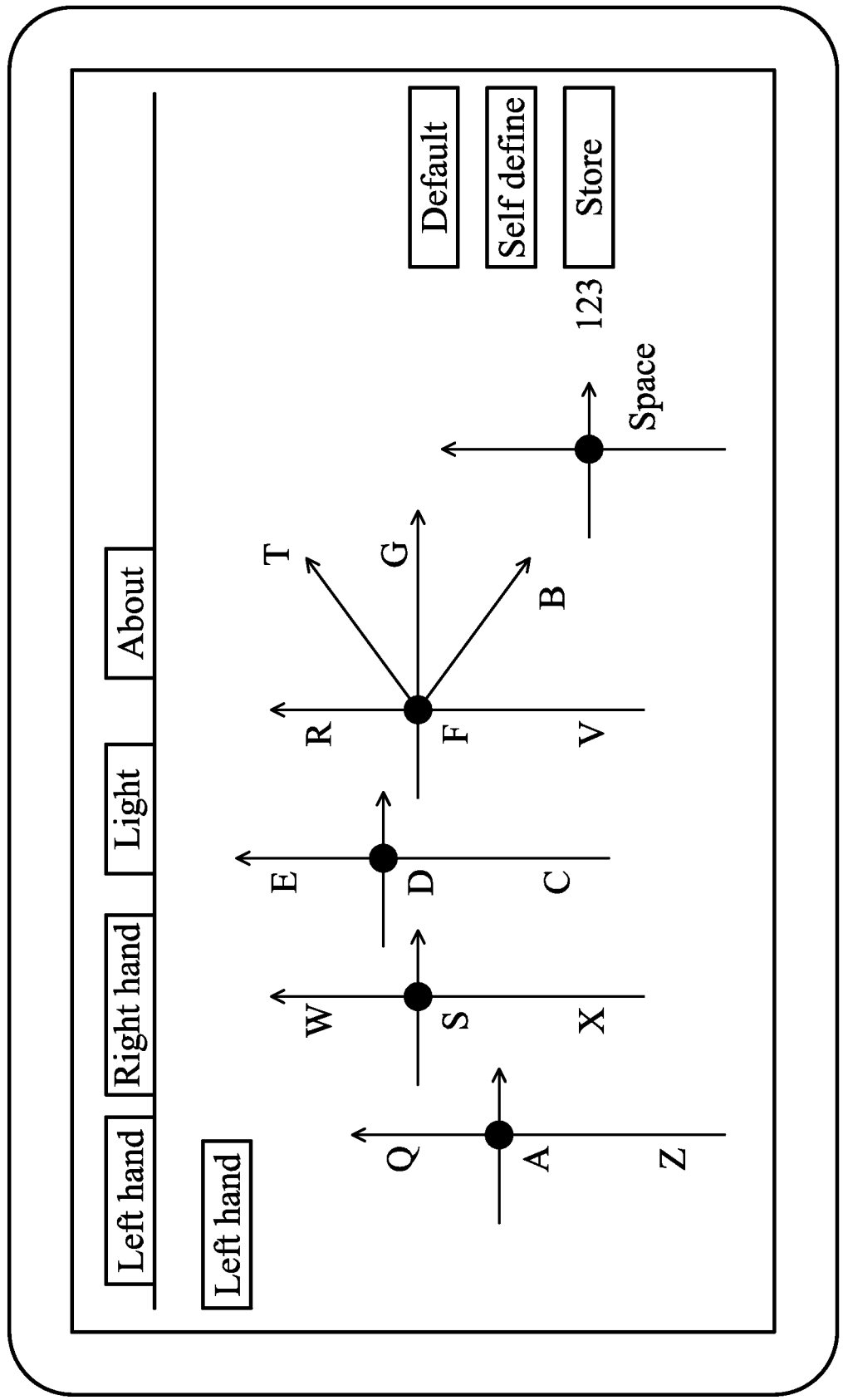
FIG. 11 shows an exemplary setting interface according to an embodiment of the invention.

In addition, according to an embodiment of the invention, the central processor 130 may also display, by executing corresponding software, a setting interface on the display panel provided for the user to adjust the corresponding settings of the virtual keyboard. FIG. 11 shows an exemplary setting interface according to an embodiment of the invention.

For example, the software setting interface may facilitate the user to set the predetermined positioning response time, the predetermined input response time, the predetermined touch time threshold as discussed above, or the like. The software setting interface may further help the user to select the default virtual keyboard and/or the default settings for the virtual keyboard, or help the user to set or adjust the positions, regions, angles and sizes of the currently positioned basic keys and virtual keys of the virtual keyboard. In addition, the software setting interface may further facilitate the user to set whether to display the position of each key of the virtual keyboard, whether to illuminate around the touch-control surface to form an illuminating region for the user to easily recognize the touch-control region, etc. In addition, the software setting interface may further facilitate the user to store and select a plurality of different virtual keyboard configurations so as to increase the flexibility of using the virtual keyboard.

In addition, according to an embodiment of the invention, the touch-control device 100 may further provide two modes for the user. The first mode is a user-defined virtual keyboard mode in which the virtual keyboard is defined by the user, as discussed above. The second mode is a system-defined default virtual keyboard mode in which a virtual keyboard is defined by the system. For example, since the user can, at most, use his ten fingers for positioning the basic keys of the virtual keyboard, in order to increase recognition accuracy, in the user-defined virtual keyboard mode, the virtual keyboard may comprise only some essential letter keys, digit keys, and control keys (such as Caps Lock, Shift, Tab, Ctrl, Backspace, Enter). The remaining function keys on a physical keyboard, such as F1~F12, may not be defined in the user-defined virtual keyboard mode. When the user has to press the undefined function key(s), the user may switch to the system-defined default virtual keyboard mode.

Figure 12:
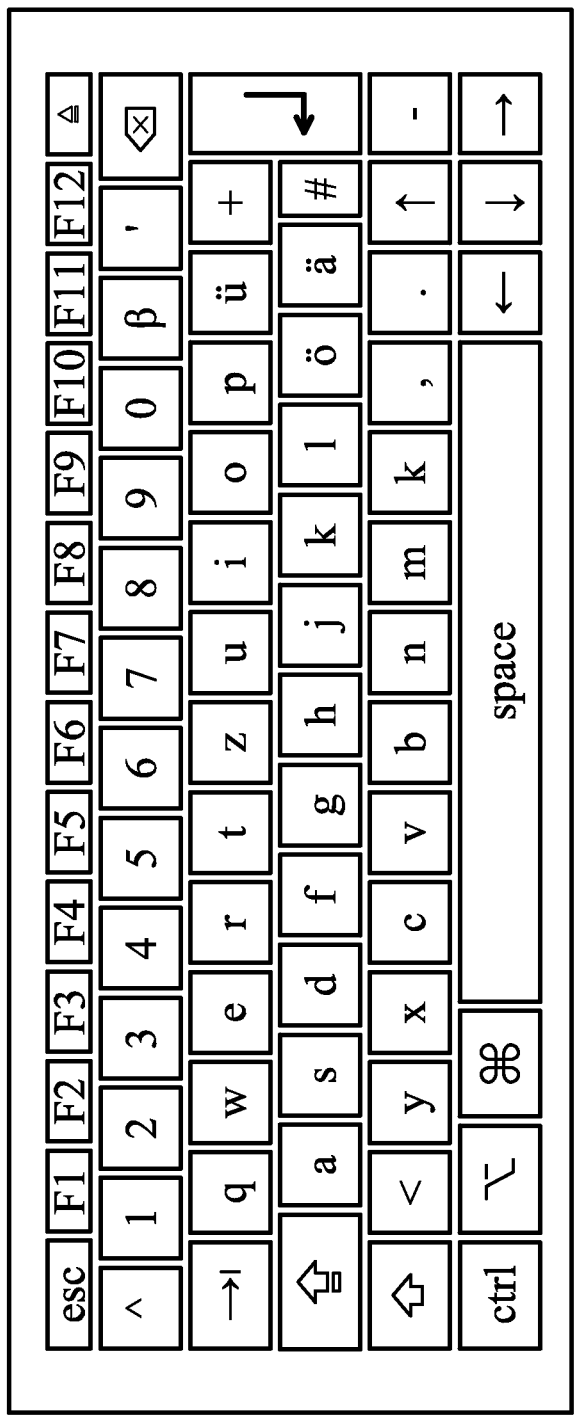
FIG. 12 shows a traditional virtual keyboard.

In the system-defined default virtual keyboard mode, the touch-control device 100 may directly display a traditional virtual keyboard on the display panel 110, such as the one shown in FIG. 12, so as to provide multiple input interfaces for the user. According to an embodiment of the invention, the touch-control device 100 may comprise a hardware switch key, such as the switch key 160 shown in FIG. 1, or may display a picture of a switch key on the screen via software, so as to allow the user to switch between two modes. The switch key may be deployed in a location that is convenient for the user to operate. For example, the hardware switch key may be deployed at one side of the touch-control device 100, or the software switch key may be displayed on the upper right portion of the screen, etc.

In addition, in the embodiment of the invention, the central processor 130 may further configure some gestures, function keys or keys other than the Space key for the control point corresponding to the thumb. Since the thumb can generally swing or move more flexibly than the other fingers, in the embodiment of the invention, the central processor 130 can configure more keys, gestures or functions for the thumb than for the other fingers.

Figure 13:
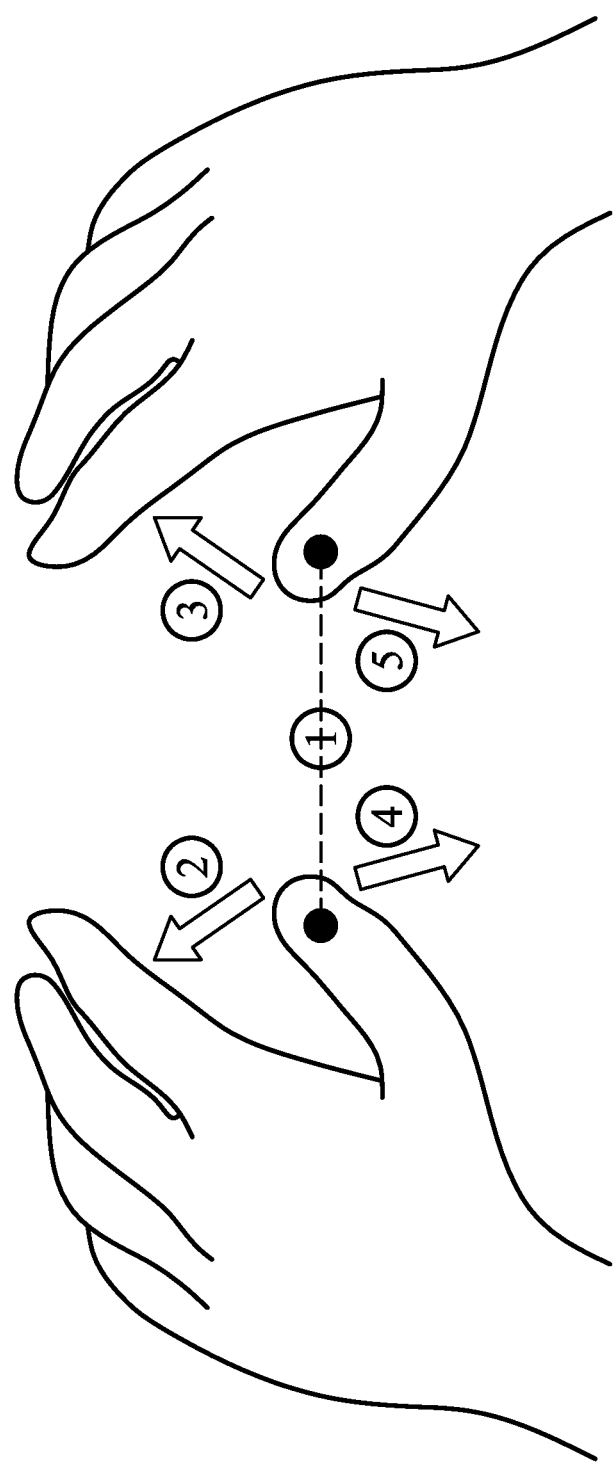
FIG. 13 is a schematic diagram showing the key or gesture configurations for two thumbs according to an embodiment of the invention.

FIG. 13 is a schematic diagram showing the key or gesture configurations for two thumbs according to an embodiment of the invention. As shown in FIG. 13, the central processor 130 may configure different keys or gestures for different touch behaviors, such as the number 1-5 shown in FIG. 13, for the thumb than for the other fingers. For example, the central processor 130 may define the positions that the two thumbs originally placed for positioning the basic keys as the origins, and then configure different ways of sliding to different keys or gestures for the thumbs. In the embodiments of the invention, the gesture may correspond to a combination of more than one key. For example, the touch behavior for the left thumb to move upward from the origin (that is, the second touch or moving behavior shown in FIG. 13) may be configured to a function when both the Ctrl key and Shift key are pressed or entered at the same time, etc.

In the embodiments of the invention, the positions of the keys on the virtual keyboard are not fixed. In other words, the virtual keyboard can be created in any place where the fingers are placed, which is a very user-friendly design. In addition, the user may easily type all the letters that he wants to type without looking at the keyboard (or, the touch-control panel) when using the virtual keyboard. Therefore, the user can relax his eyes. In addition, in addition to typing letters, some control functions such as using slides or gestures are added, so that the user can complete the corresponding functions via the touch behavior or gestures defined by him. Therefore, compared to conventional designs, the proposed virtual keyboard architecture and the method for determining keys of a virtual keyboard can not only improve the recognition accuracy of the virtual keyboard, but also can be more efficient than the conventional designs.

The embodiments of the present invention can be implemented in any of numerous ways. For example, the embodiments may be implemented using hardware, software or a combination thereof. It should be appreciated that any component or collection of components that perform the functions described above can be generically considered as one or more processors that control the function discussed above. The one or more processors can be implemented in numerous ways, such as with dedicated hardware, or with general-purpose hardware that is programmed using microcode or software to perform the functions recited above.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A touch-control device, comprising:
a touch-control panel, comprising a touch-control surface;
a touch sensor, sensing a plurality of touched positions and at least one touch behavior on the touch-control surface; and
a central processor, coupled to the touch sensor, processing information regarding the touched positions and the touch behavior sensed by the touch sensor,
wherein the central processor is programmed to perform multi-finger positioning for a hand of a user by first determining positions and a number of control points according to the touched positions of fingers sensed by the touch sensor in a first touching by the user, determining a plurality of basic keys of a virtual keyboard according to the number and the positions of the control points, configuring one basic key of the basic keys and at least one virtual key of the virtual keyboard for each control point to complete configuration of the basic keys, and then, in response to the number of control points is less than five, configuring one or more remaining keys of the virtual keyboard for one or more touch points other than the control points, wherein the one or more touch points are generated according to the touched positions sensed by the touch sensor in a second touching by the user of one or more fingers not used in the first touching and performed after the first touching, wherein the configured basic and remaining keys of the virtual keyboard are displayed on a screen of the touch-control device according to the control points, and wherein when determining which key on the virtual keyboard is input, the central processor determines an input behavior of the user within a predetermined input response time according to the touch behavior of at least one of the control points on the touch-control surface or the touch behavior of at least one of the one or more touch points on the touch-control surface, and determines which key on the virtual keyboard is input by the user, wherein the one or more remaining keys configured for the one or more touch points are different from the basic key and the at least one virtual key configured for each control point, wherein each control point corresponds to one finger of the user, wherein the central processor is programmed to detect whether the user performs a five-finger positioning, a four-finger positioning, a three-finger positioning or a two-finger positioning according to the number of the control points corresponding to a hand of the user sensed by the touch sensor in the first touching;

wherein the central processor is programmed to configure the basic keys and the virtual keys for the control points according to which one of five-finger positioning, the four-finger positioning, three-finger positioning and the two-finger positioning is detected; and wherein the configurations of basic keys and the virtual keys for the control points for five-finger positioning, the four-finger positioning, three-finger positioning and the two-finger positioning are different.

2. The touch-control device as claimed in claim 1, wherein the touch behavior on the touch-control surface comprises any of a move, slide, tap and click on the touch-control surface.

3. The touch-control device as claimed in claim 1, wherein when the central processor determines which key on the virtual keyboard is input by the user, the central processor first determines which control point the touch behavior is performed by and then selects one from the basic key and the at least one virtual key configured for the determined control point as the key input by the user.

4. The touch-control device as claimed in claim 3, wherein the basic key and the at least one virtual key configured for each control point are different.

5. The touch-control device as claimed in claim 1, wherein the central processor further determines which finger of the user the input behavior is performed by according to the touch behavior of the control points on the touch-control surface.

6. The touch-control device as claimed in claim 1, wherein the central processor determines which key on the virtual keyboard is input by the user further according to the touch behavior of at least one of the one or more touch points on the touch-control surface.

7. The touch-control device as claimed in claim 3, wherein after determining which control point the touch behavior is performed by, the central processor selects one from the basic key and at least one virtual key configured for the determined control point as the key input by the user according to a position of the touch behavior on the touch-control surface or according to at least one vector generated based on the position of the touch behavior with respect to a position of the basic key configured for the determined control point.

8. The touch-control device as claimed in claim 6, wherein the central processor determines which key on the virtual keyboard is input by the user according to a position of the touch behavior of the touch point on the touch-control surface or according to at least one vector generated based on the position of the touch behavior with respect to a position of the basic key configured for a control point which is adjacent to the touch point.

9. A method for determining keys of a virtual keyboard, suitable for a touch-control device comprising a touch-control surface, comprising:

determining positions and a number of control points for a hand of a user according to touched positions of fingers sensed on the touch-control surface in a first touching by the user, wherein each control point corresponds to one finger of the user;

detecting whether the user performs a five-finger positioning, a four-finger positioning, a three-finger positioning or a two-finger positioning according to the number of the control points corresponding to a hand of the user sensed by the touch sensor in the first touching;

determining a plurality of basic keys of the virtual keyboard according to the number and the positions of the control points;

configuring one basic key of the basic keys and at least one virtual key of the virtual keyboard for each control point to complete configuration of the basic keys, wherein the configurations of basic keys and the virtual keys for the control points for the five-finger positioning, the four-finger positioning, three-finger positioning and the two-finger positioning are different;

after configuration of the basic keys, configuring one or more remaining keys of the virtual keyboard for one or more touch points other than the control points in response to the number of control points is less than five, wherein the one or more touch points are generated according to touched positions sensed on the touch-control surface in a second touching by the user of one or more fingers not used in the first touching and performed after the first touching, wherein the configured basic and remaining keys of the virtual keyboard are displayed on a screen of the touch-control device according to the control points;

determining an input behavior of a user within a predetermined input response time according to at least one touch behavior of at least one control point on the touch-control surface or at least one touch behavior of at least one of the one or more touch points on the touch-control surface; and determining which key on the virtual keyboard is input by the user, wherein the one or more remaining keys configured for the one or more touch points are different from the basic key and the at least one virtual key configured for each control point.

10. The method as claimed in claim 9, wherein the touch behavior on the touch-control surface comprises any of a move, slide, tap and click on the touch-control surface.

11. The method as claimed in claim 9, wherein the step of determining which key on the virtual keyboard is input by the user further comprise:

determining which control point the touch behavior is performed by; and selecting one from the basic key and the at least one virtual key configured for the determined control point as the key input by the user.

12. The method as claimed in claim 11, wherein the basic key and the at least one virtual key configured for each control point are different.

13. The method as claimed in claim 9, the step of determining an input behavior of a user according to at least one touch behavior of at least one control point on the touch-control surface further comprises:
determining which finger of the user the input behavior is performed by according to the touch behavior of the control points on the touch-control surface.

14. The method as claimed in claim 9, further comprising:
determining which key on the virtual keyboard is input by the user according to on the touch-control surface.

15. The method as claimed in claim 11, wherein the step of selecting one from the basic key and the virtual key configured for the determined control point as the key input by the user further comprises:
after determining which control point the touch behavior is performed by, selecting one from the basic key and the at least one virtual key configured for the determined control point as the key input by the user according to a position of the touch behavior on the touch-control surface or according to at least one vector generated based on the position of the touch behavior with respect to a position of the basic key configured for the determined control point.

16. The method as claimed in claim 14, further comprising:
determining which key on the virtual keyboard is input by the user according to a position of the touch behavior of the touch point on the touch-control surface or according to at least one vector generated based on the position of the touch behavior with respect to a position of the basic key configured for a control point which is adjacent to the touch point.

17. A method for determining keys of a virtual keyboard, suitable for a touch-control device comprising a touch-control surface, comprising:
determining positions of a plurality of control points for a hand of a user according to touched positions of fingers sensed on the touch-control surface in a first touching by the user, wherein each control point corresponds to one finger of the user;
detecting whether the user performs a five-finger positioning, a four-finger positioning, a three-finger positioning or a two-finger positioning according to the number of the control points corresponding to a hand of the user sensed by the touch sensor in the first touching;
determining positions of a plurality of basic keys of the virtual keyboard according to the positions of the control points;
configuring one basic key of the basic keys and at least one virtual key of the virtual keyboard for each control point to complete configuration of the basic keys, wherein the configurations of basic keys and the virtual keys for the control points for the five-finger positioning, the four-finger positioning, three-finger positioning and the two-finger positioning are different;
after configuring the basic keys, configuring one or more remaining keys of the virtual keyboard for one or more touch points other than the control points in response to the number of control points is less than five, wherein the one or more touch points are generated according to touched positions sensed on the touch-control surface in a second touching by the user of one or more fingers not used in the first touching and performed after the first touching, and wherein the one or more remaining keys configured for the one or more touch points are different from the basic key and the at least one virtual key configured for each control point, wherein the configured basic and remaining keys of the virtual keyboard are displayed on a screen of the touch-control device according to the control points;
determining an input behavior of a user within a predetermined input response time according to at least one touch behavior of at least one control point on the touch-control surface or at least one touch behavior of at least one of the one or more touch points other than the control points on the touch-control surface; and
determining which key on the virtual keyboard is input by the user.

18. The method as claimed in claim 17, wherein the step of determining which key on the virtual keyboard is input by the user further comprises:
determining which key on the virtual keyboard is input by the user according to a position of the touch behavior of the touch point or the at least one control point on the touch-control surface or according to at least one vector generated based on the position of the touch behavior with respect to a position of the basic key configured for the at least one control point or the position of the basic key which is adjacent to the touch point.

* * * * *